US012301904B2

United States Patent
Srigiri et al.

(10) Patent No.: US 12,301,904 B2
(45) Date of Patent: May 13, 2025

(54) USER INTERFACE CUSTOMIZATION IN A TELEVISION PLATFORM

(71) Applicant: GOOGLE LLC, Mountain View, CA (US)

(72) Inventors: Ashwin Kumar Srigiri, Karnataka (IN); Rohit Nigam, Karrnataka (IN); Laxmi Kaushik Reddy Mukkamalla, Andhra Pradesh (IN); Nipun Asthana, Karnataka (IN); Ashish Agrawal, Palo Alto, CA (US); Rajneesh Kumar, Karnataka (IN); Manoj Mani, Karnataka (IN); Padmaja Ragavendra, Karnataka (IN); Akanksha Kalia, Uttarakhand (IN)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 18/187,418

(22) Filed: Mar. 21, 2023

(65) Prior Publication Data

US 2024/0323468 A1    Sep. 26, 2024

(51) Int. Cl.
*H04N 21/258* (2011.01)
*H04N 21/262* (2011.01)
*H04N 21/431* (2011.01)

(52) U.S. Cl.
CPC . *H04N 21/25858* (2013.01); *H04N 21/25841* (2013.01); *H04N 21/26283* (2013.01); *H04N 21/4314* (2013.01)

(58) Field of Classification Search
CPC ....... H04N 21/25858; H04N 21/25841; H04N 21/26283; H04N 21/4314
See application file for complete search history.

(56) References Cited

U.S. PATENT DOCUMENTS 6,353,444 B1 * 3/2002 Katta ............... H04N 21/42204
                                                    715/810
7,613,790 B2 * 11/2009 Slothouber ........ H04N 21/2402
                                                    709/219

(Continued)

OTHER PUBLICATIONS

"TV input framework", Google Android, retrieved on Aug. 3, 2021 from https://source.android.com/docs/devices/tv, 24 pages.

(Continued)

*Primary Examiner* — Michael B. Pierorazio
(74) *Attorney, Agent, or Firm* — Brake Hughes Bellermann LLP

(57) ABSTRACT

In some aspects, a method includes storing a configuration database at a media platform. The configuration database includes base customization data associated with the media platform and manufacturer customization data associated with a plurality of manufacturers of television devices. The method includes receiving a configuration request from a television device, where the configuration request includes a location and/or a device identifier of the television device. The method includes selecting a portion of the manufacturer customization data that correspond to the location and/or the device identifier of the television device, generating server-based customization data for the television device based on the portion of the manufacturer customization data and the base customization data, and transmitting the server-based customization data to the television device, where the server-based customization data is configured to be used by the television device to customize a user interface of the media platform.

19 Claims, 11 Drawing Sheets

(56) References Cited

U.S. PATENT DOCUMENTS

| | | | |
|---|---|---|---|
| 7,995,903 B2* | 8/2011 | Kato | H04N 21/47214 725/50 |
| 2004/0226043 A1* | 11/2004 | Mettu | H04N 21/25841 348/E7.071 |
| 2005/0138659 A1* | 6/2005 | Boccon-Gibod | H04N 5/76 725/35 |
| 2007/0126884 A1* | 6/2007 | Xu | H04N 21/433 348/E5.127 |
| 2007/0150617 A1 | 6/2007 | Hariki | |
| 2007/0157247 A1* | 7/2007 | Cordray | G06Q 30/02 348/E5.006 |
| 2007/0157260 A1* | 7/2007 | Walker | H04N 21/47214 725/86 |
| 2007/0174862 A1* | 7/2007 | Kushida | H04N 21/47 725/15 |
| 2007/0276690 A1* | 11/2007 | Ohtani | H04H 60/65 348/E5.002 |
| 2009/0063179 A1 | 3/2009 | Huang | |
| 2009/0172757 A1* | 7/2009 | Aldrey | H04N 7/173 725/110 |
| 2009/0217324 A1* | 8/2009 | Massimi | H04H 60/46 725/9 |
| 2011/0047568 A1* | 2/2011 | Yeh | H04N 21/6125 725/38 |
| 2011/0069940 A1* | 3/2011 | Shimy | H04N 21/4532 386/296 |
| 2011/0070819 A1* | 3/2011 | Shimy | H04H 60/52 707/E17.014 |
| 2011/0072452 A1* | 3/2011 | Shimy | H04N 21/44218 725/25 |
| 2011/0247036 A1* | 10/2011 | Adimatyam | H04N 21/4755 725/87 |
| 2011/0283320 A1* | 11/2011 | Levin | H04N 21/252 725/40 |
| 2011/0314502 A1* | 12/2011 | Levy | H04N 21/4532 725/46 |
| 2012/0054634 A1* | 3/2012 | Stone | G06F 16/9577 715/745 |
| 2012/0233552 A1* | 9/2012 | Chee | H04L 12/2814 715/745 |
| 2013/0219429 A1 | 8/2013 | Hirsch et al. | |
| 2016/0259840 A1 | 9/2016 | Zheng et al. | |
| 2017/0155949 A1 | 6/2017 | Jacoby | |

OTHER PUBLICATIONS

International Search Report and Written Opinion for PCT Application No. PCT/US2024/020983, mailed on Jul. 10, 2024, 12 pages.

* cited by examiner

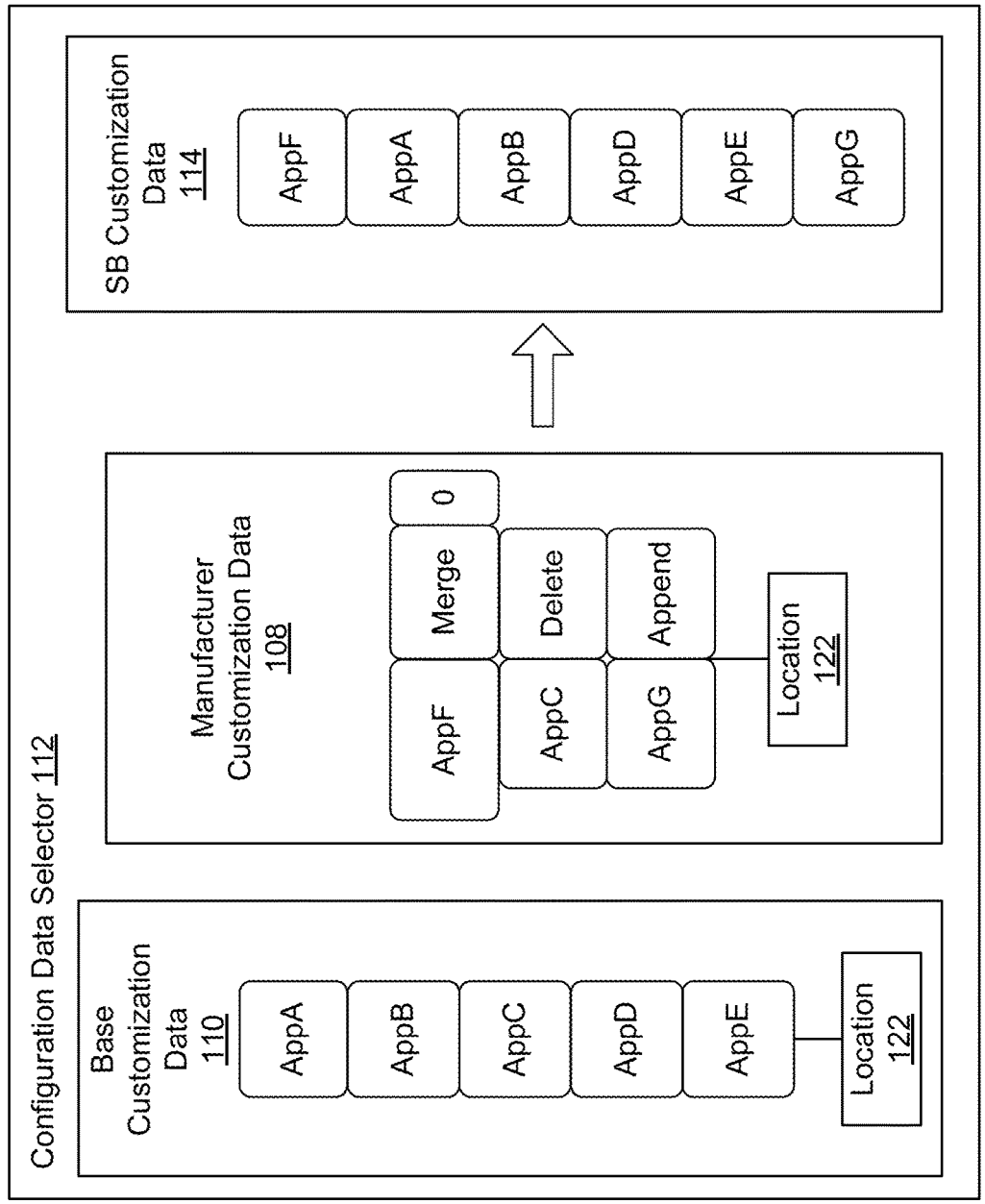

USER INTERFACE CUSTOMIZATION IN A TELEVISION PLATFORM

BACKGROUND

A television device may include (or is associated with) an operating system configured to execute applications and provide a user interface associated with a media platform. For certain devices or devices within a particular region, a particular manufacturer may wish to customize aspects of the platform's user interface and its integration with their television devices. However, there may be technical challenges associated with implementing customizations on the television device from the media platform and the manufacturer.

SUMMARY

In some aspects, the techniques described herein relate to a method including: storing a configuration database at a media platform, the configuration database including base customization data associated with the media platform, the configuration database including manufacturer customization data associated with a plurality of manufacturers of television devices; receiving, by the media platform, a configuration request from a television device, the configuration request including at least one of a location or a device identifier of the television device; in response to the configuration request, selecting a portion of the manufacturer customization data that correspond to at least one of the location or the device identifier of the television device; generating server-based customization data for the television device based on the portion of the manufacturer customization data and the base customization data; and transmitting, over a network, the server-based customization data to the television device, the server-based customization data configured to be used by the television device to customize an aspect of a user interface of the media platform that is displayed by the television device.

In some aspects, the techniques described herein relate to a non-transitory computer-readable medium storing executable instructions that when executed by at least one processor cause the at least one processor to execute operations, the operations including: obtaining client-side customization data from a customization application of a television device; determining whether a user of the television device has successfully logged into a user account associated with a media platform; in response to the user being determined as successfully logged into the user account, transmitting, over a network, a configuration request to the media platform, the configuration request including at least one of a location or a device identifier of the television device; receiving, over the network, server-based customization data that correspond to at least one of the location or the device identifier, the server-based customization data including a customization to a user interface of the media platform; and configuring the television device, including the user interface, using at least one of the client-side customization data or the server-based customization data.

In some aspects, the techniques described herein relate to an apparatus including: at least one processor; and a non-transitory computer-readable medium storing executable instructions that when executed by at least one processor cause the at least one processor to: receive, over a network, base customization data from a computing device associated with an administrator of a media platform; store the base customization data in a configuration database, the configuration database also storing manufacturer customization data associated with a plurality of manufacturers of television devices; receive a configuration request from a television device, the configuration request including at least one of a location or a device identifier of the television device; in response to the configuration request, select a portion of the manufacturer customization data that correspond to at least one of the location or the device identifier of the television device; generate server-based customization data for the television device based on the portion of the manufacturer customization data and the base customization data; and transmit, over a network, the server-based customization data to the television device, the server-based customization data configured to be used by the television device to customize an aspect of a user interface of the media platform that is displayed by the television device.

The details of one or more implementations are set forth in the accompanying drawings and the description below. Other features will be apparent from the description and drawings, and from the claims.

BRIEF DESCRIPTION OF THE DRA WINGS

FIG. 1G illustrates another example of the configuration data selector according to an aspect.

DETAILED DESCRIPTION

Figure 1A:
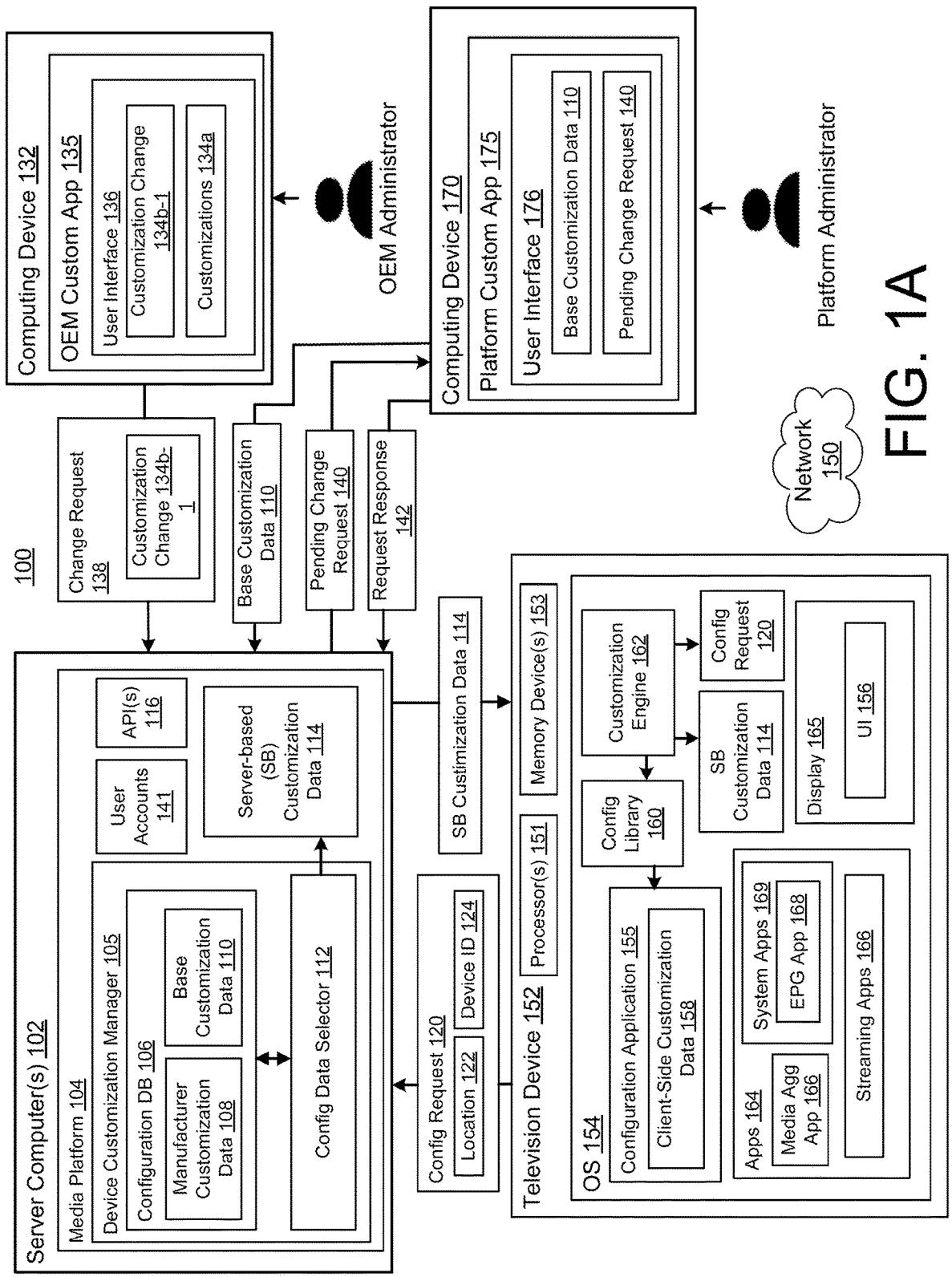
FIG. 1A illustrates a perspective of a system that includes a media platform, a television device, a computing device associated with an administrator of a manufacturer, and a computing device associated with an administrator of the media platform according to an aspect.

This disclosure relates to a system configured to customize a television device that renders a user interface associated with a media platform using one or more attributes such as a location of the television device and a device identifier. In some examples, the device identifier is an original equipment manufacturer (OEM) identifier. In some examples, the device identifier is a product identifier. The media platform is associated with an entity that is different from the OEM of the television device. The media platform may identify and recommend content from multiple streaming applications, which may be personalized to a user account, in a single user interface (referred to as the platform's user interface). The system provides a framework that enables the media platform to control the customizations to their user interface while providing an ability to support OEM exceptions to the customizations across locations and/or device identifiers.

In further detail, when a television device is initially activated, the user may be directed to a series of interfaces to configure (e.g., set-up) the television device. During the set-up process, the user may select certain applications, which causes the television device to install those applications. Also, there may be a list of applications that will be automatically installed (e.g., pre-installed) during the set-up process. The list of applications may be customized across different locations (e.g., countries). Also, an OEM may wish to customize the list of pre-installed applications (e.g., to include their preferred application or remove an application from the list) for certain regions or certain types of television devices. Furthermore, the platform's user interface may include a section that identifies a list of installed applications (e.g., "my app" section), and the display order of the applications may be customized (e.g., application XYZ is placed before application ABC in a row of applications). In some examples, the OEM may wish to customize the display order of the user's installed applications. Furthermore, other customizations associated with the television device may be defined by the media platform and/or the OEMs.

Some conventional systems may become unscalable in a relatively short amount of time due to the relatively large amount of customization entries being recorded, and/or the relatively large number of updates to be synced with manufacturers and merged with existing platform customizations. However, the system discussed herein may manage and implement the various customizations to television devices across locations, OEMs, and/or devices in a manner that may decrease the amount of computer memory to store such entries and may increase the speed at which customizations can be implemented by the television devices.

In further detail, the media platform may store a configuration database. The configuration database includes base customization data associated with the media platform. For example, an administrator of the media platform may use their computing device to generate and transmit the base customization data to the media platform to be stored in the configuration database. The base customization data may include customizations to one or more aspects of the user interface of the media platform across locations, OEMs, and/or devices. Some of the customizations may be modifiable by OEMs. Some of the customizations may be not modifiable by OEMs.

The customizations may be a list of applications to be automatically installed on the operating system of the television device during the set-up process (e.g., pre-installed before the user is provided access to the platform's user interface). In some examples, the customizations may include application placement data defining an ordered list of applications that are identified in a section (e.g., row) of the platform's user interface. The customizations may include other customization parameters such as selectable options for triggering a system notification (e.g., a power-on notification), virtual inputs, tuner data, and/or a destination location of a guide control button (e.g., the destination location may be the live tab in the platform's user interface or the electronic programming guide (EPG) of the television's EPG application).

The media platform may communicate with an OEM customization application (e.g., a web application, a web portal, etc.) on an OEM's computing device to receive one or more changes to the customizations defined by the base customization data. The media platform may store these changes as manufacturer customization data in the configuration database. For example, an OEM administrator may use the OEM customization application to submit change requests to change the list of pre-installed applications, change the ordered list of applications to be displayed in the platform's user interface and/or other aspects of the platform's user interface for certain locations and/or product identifiers. When approved by the platform administrator, these customization changes may be stored in the configuration database.

On the server-side, the media platform may receive a configuration request from the television device. The configuration request includes the location and/or the device identifier. In response to the configuration request, the media platform may select a portion of the base customization data that corresponds to the location and/or the device identifier of the television device and may select a portion of the manufacturer customization data that corresponds to the location and/or the device identifier. The media platform may generate server-based customization data for the television device based on the portion of the manufacturer customization data and the portion of the base customization data. In some examples, the media platform may merge the portion of the manufacturer customization data with the portion of the base customization data. The media platform may transmit, over a network, the server-based customization data to the television device. The server-based customization data is configured to be used by the television device to customize an aspect of a user interface of the media platform that is displayed by the television device. In some examples, the media platform may periodically receive the customization request from the television device, where the media platform may use the same operations to re-generate and re-transmit the server-based customization data to the television device, thereby enabling dynamic customization parameters on the television devices.

The television device may include an operating system defining a customization engine. The customization engine may invoke a configuration library to read and parse a customization application to obtain client-side customization data. The client-side customization data may define one or more static customizations (e.g., one-time customizations). The client-side customization data may define a list of system applications to be displayed in the section of the platform's user interface when the operating system is operating in a restricted mode. For example, the customization engine may determine whether a user of the television device has successfully logged into a user account and/or whether the television device is connected to a network, and, if not, the customization engine may initiate a restricted mode. In the restricted mode, the platform's user interface may be displayed with the list of system applications defined in the client-side customization data. If the operating system is not in the restricted mode, the customization engine may transmit the configuration request and then receive the server-based customization data as described above.

FIGS. 1A through 1G illustrate a system 100 configured to customize a television device 152 that renders a user interface 156 associated with a media platform 104 based on one or more attributes such as a location 122 of the television device 152 and a device identifier 124 of the television device 152. The media platform 104 is associated with an entity that is different from an original equipment manufacturer (OEM) 121 (also referred to as a manufacturer) of the television device 152. The system 100 provides a framework that enables the media platform 104 to control the customizations (e.g., base customization data 110) to their user interface 156 while providing an ability to support OEM exceptions (e.g., customization changes 134b) to the base customization data 110.

Figure 1B:
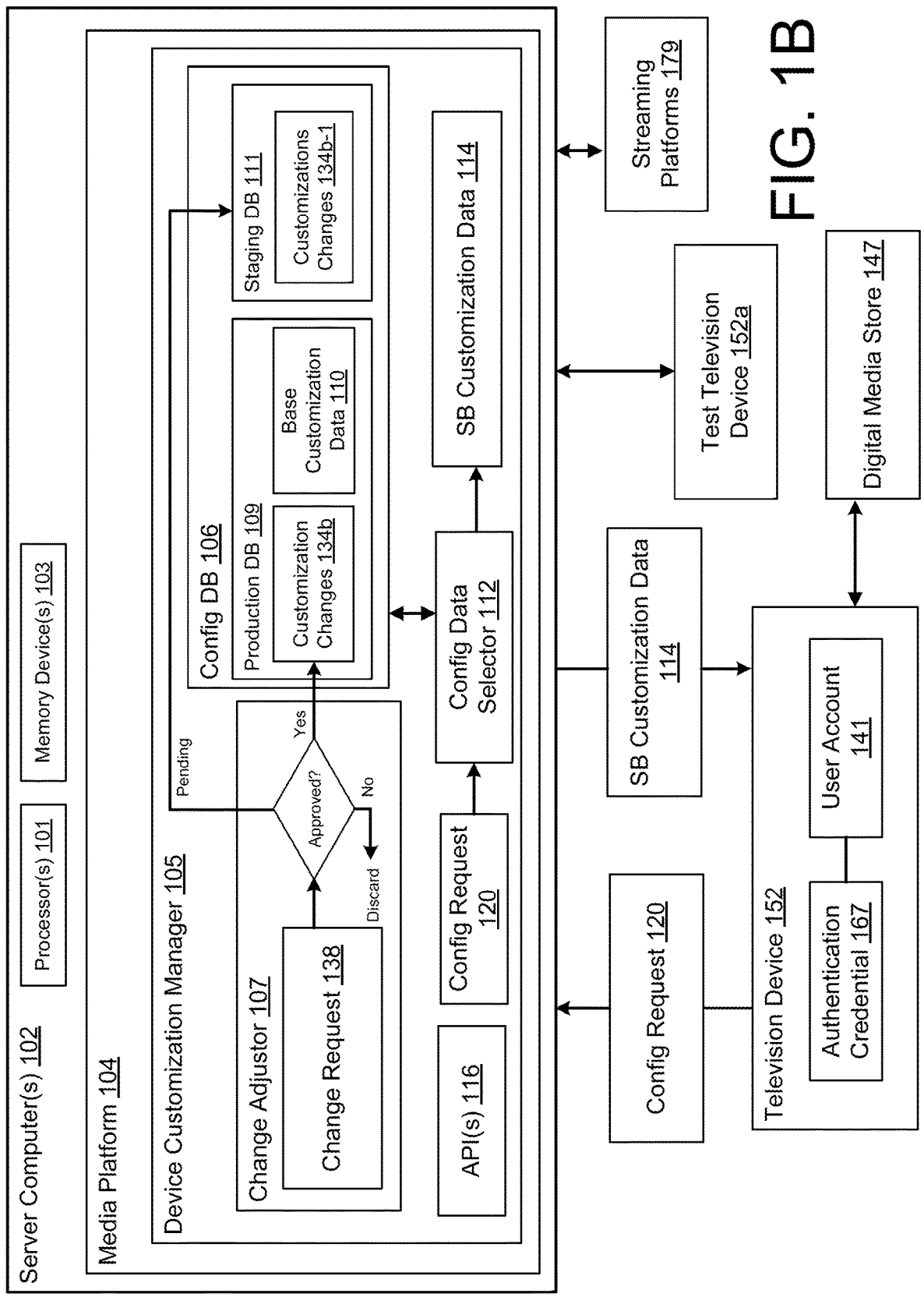
FIG. 1B illustrates an example of the media platform and example communications between the media platform and the television device according to an aspect.
Figure 1C:
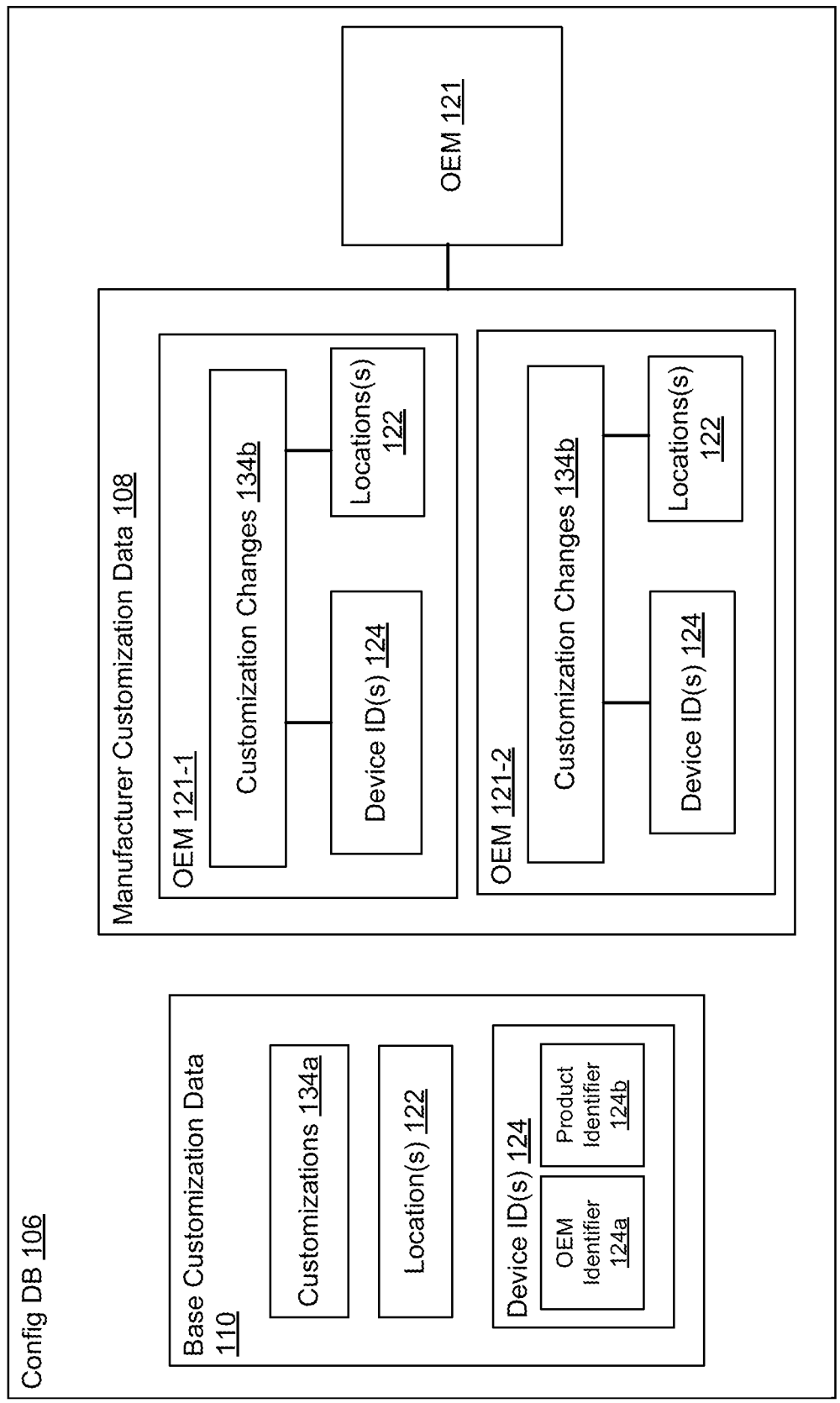
FIG. 1C illustrates an example of a configuration database stored on the media platform according to an aspect.
Figure 1E:
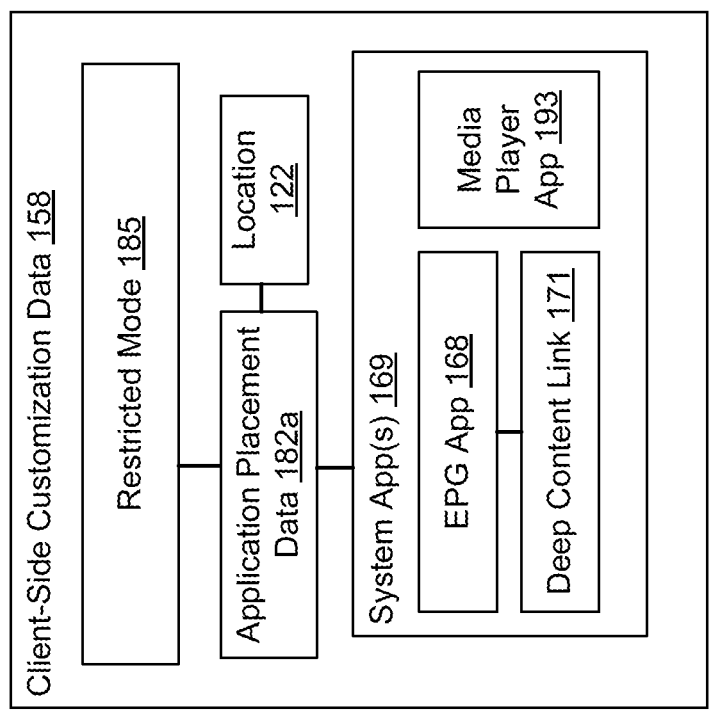
FIG. 1E illustrates an example of client-side customization data included in a configuration application according to an aspect.
Figure 1D:
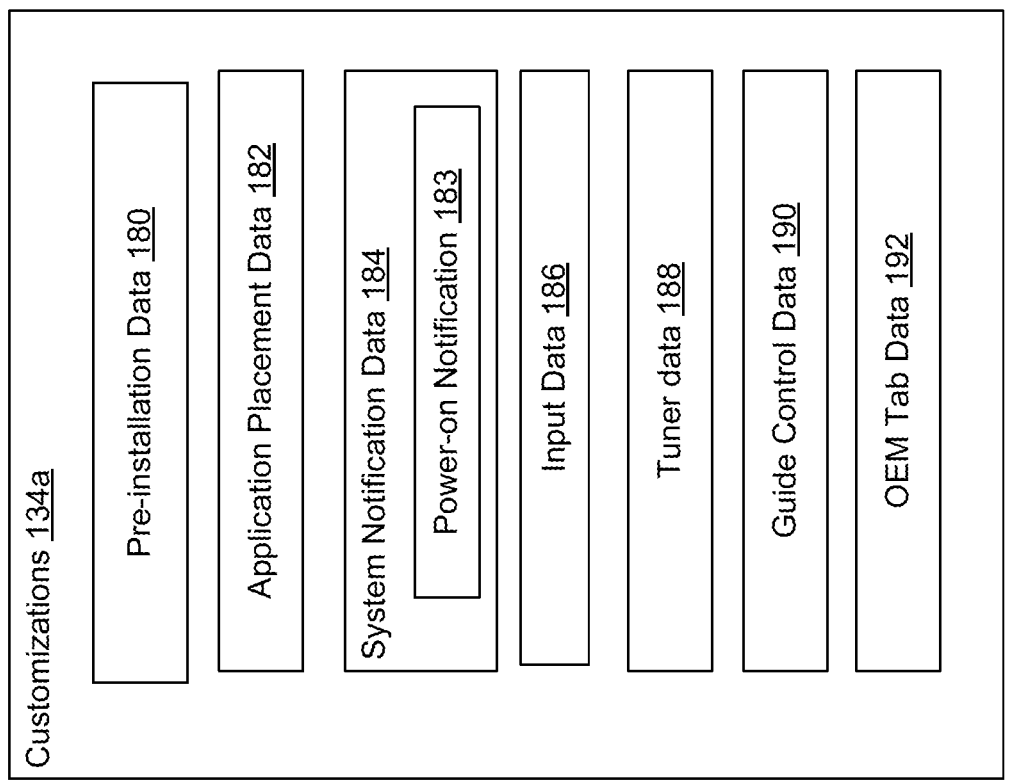
FIG. 1D illustrates examples of customizations definable by the media platform according to an aspect.
Figure 1F:
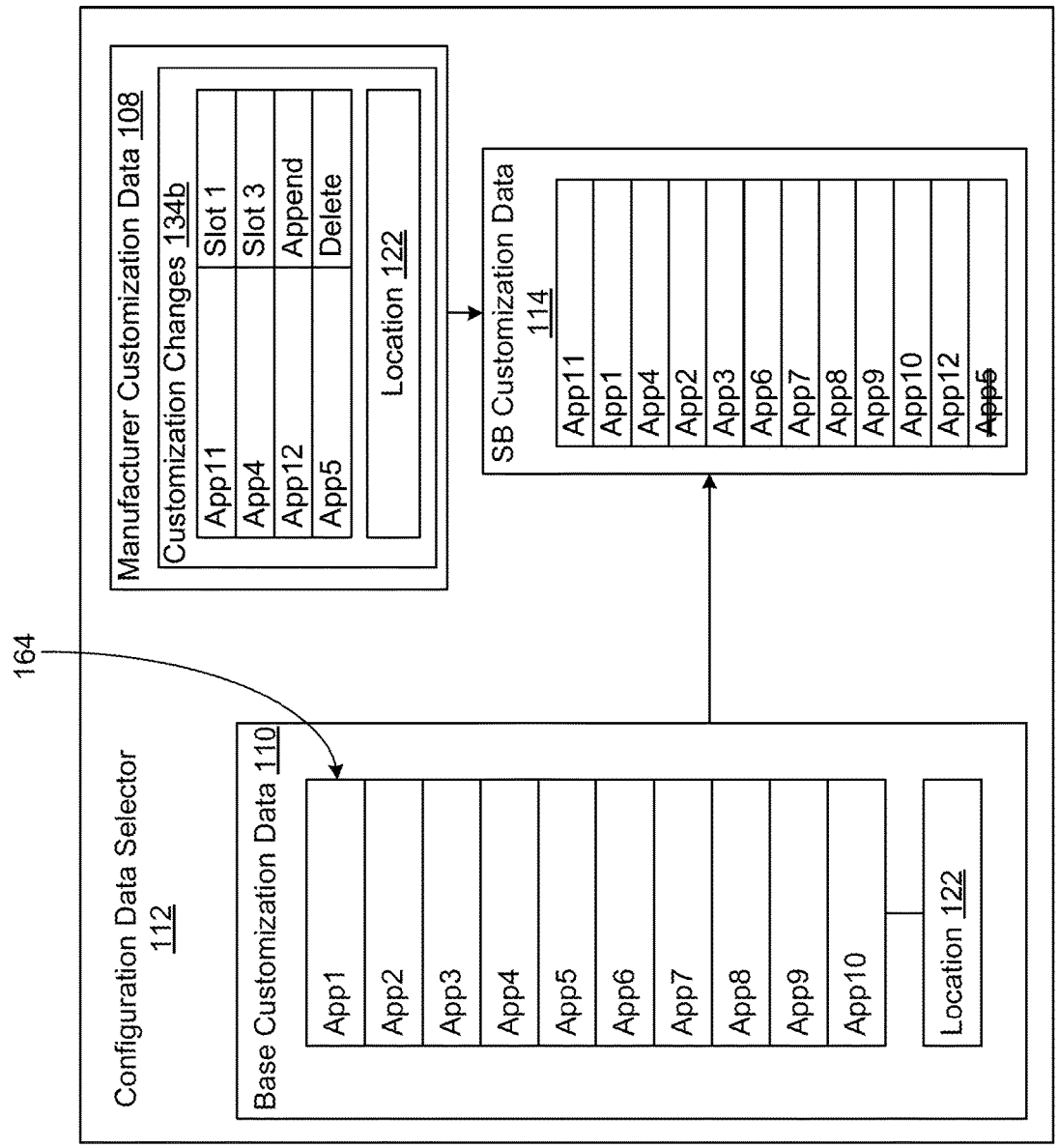
FIG. 1F illustrates an example of a configuration data selector that generates server-based customization data by merging portions of the base customization data and the manufacturer customization data according to an aspect.

FIG. 1A illustrates a perspective of the system 100 that includes a media platform 104, a television device 152, a computing device 132 associated with an OEM administrator, and a computing device 170 associated with an administrator of the media platform 104. FIG. 1B illustrates an example of the media platform 104 and example communications between the media platform 104 and the television device 152. FIG. 1C illustrates an example of a configuration database 106 stored on the media platform 104. FIG. 1D illustrates examples of customizations 134a definable by the media platform 104. Some of the customizations 134a may be modifiable by the OEMs 121. FIG. 1E illustrates an example of client-side customization data 158 included in a configuration application 155 on the operating system 154 of the television device 152. FIG. 1F illustrates an example of a configuration data selector 112 that generates server-based customization data 114 by merging portions of the base customization data 110 and the manufacturer customization data 108. FIG. 1G illustrates another example of the configuration data selector 112.

The television device 152 may be a network-enabled display device configured to connect to a network 150. The television device 152 may be a smart television. The television device 152 includes one or more processors 151, one or more memory devices 153, and an operating system 154 configured to execute (or assist with executing) applications 164. In some examples, the operating system 154 is a browser application. A browser application is a web browser configured to access information on the Internet and may launch one or more browser tabs in the context of one or more browser windows. In some examples, the operating system 154 is a Linux-based operating system. In some examples, the operating system 154 is a mobile operating system that is also configured to execute on smaller devices (e.g., smartphones, tablets, wearables, etc.).

The processor(s) 151 may be formed in a substrate configured to execute one or more machine executable instructions or pieces of software, firmware, or a combination thereof. The processor(s) 151 can be semiconductor-based—that is, the processors can include semiconductor material that can perform digital logic. The memory device(s) 153 may include a main memory that stores information in a format that can be read and/or executed by the processor(s) 101. The memory device(s) 153 may include one or more random-access memory (RAM) devices and/or one or more read-only memory (ROM) devices. The memory device(s) 153 may store applications (e.g., the operating system 154 (including sub-components of the operating system 154 such as the configuration library 160, the customization engine 162, etc.), the applications 164, etc.) that, when executed by the processors 151, perform certain operations discussed herein.

The applications 164 may include streaming applications 166 configured to stream media content (e.g., programs, movies, live content, etc.) from corresponding streaming platforms 179 to the television device 152. The streaming applications 164 may be downloaded from a digital media store 147 and installed on the television device 152. An application 164 (including a streaming application 166) may be a software program that is developed for use on a particular platform or device, or for a particular operating system. In some examples, the application 164 (including a streaming application 166) is a software program that is developed for multiple platforms or devices. In some examples, the applications 164 include system applications 169. The system applications 169 may be applications associated with the television device 152 (e.g., installed during manufacture of the television device 152). In some examples, the system applications 169 are not downloadable from a digital media store 147. The system applications 169 may include an electronic programming guide (EPG) application 168. In some examples, the EPG application 168 is an application associated with the OEM 121 and may provide the programming information for tuner-based channels detected by the television device 152.

The applications 164 may include a media aggregator application 166. In some examples, the media aggregator application 166 is a streaming application 166. In some examples, the media aggregator application 166 is a program that is part of the operating system 154, and therefore any operations discussed with reference to the media aggregator application 166 may be executed by the operating system 154. In some examples, the media aggregator application 166 is a separate standalone application that is downloadable from a digital media store 147 and installed on the operating system 154. In some examples, the television device 152 is not a smart television, but is converted to a smart television when connected to a casting device, where the casting device is configured to connect to the network 150 and execute the operating system 154, including the media aggregator application 166.

The media aggregator application 166 is configured to render a user interface 156 on a display of the television device 152 that enables the user to select media content (e.g., programs, movies, live content, etc.) to watch on the television device 152. The user interface 156 is associated with the media platform 104. In some examples, the user interface 156 is a system interface (e.g., home interface) that is displayed when the television device 152 is activated (e.g., powered-on). The user interface 156 may provide information about which applications 164 (e.g., streaming applications 166) are installed on the operating system 154. Also, the user interface 156 may identify media content to watch across various streaming platforms 179, which may be personalized to the user account 141. For example, instead of locating media content items (e.g., programs, movies, TV shows, live content, etc.) to stream via the individual streaming applications 166, the user may use the user interface 156 to identify and/or search for media content items across various streaming platforms 179.

The media aggregator application 166 (e.g., in conjunction with the media platform 104) may aggregate (e.g., combine, assemble, collect, etc.) information about media content items available for viewing (e.g., streaming) from multiple streaming platforms 179 (e.g., associated with the streaming applications 166) and present the information in the user interface 156 on the display 165 of the television device 152. In some examples, the media aggregator application 166 may display an EPG for live content in a tab (e.g., a live tab 323 of FIG. 3B) of the user interface 156. The EPG provided by the media aggregator application 166 may be separate from the EPG provided by the EPG application 168.

In some examples, the user interface 156 is a tabbed interface having a plurality of tabs. The plurality of tabs may include a search tab to search for media content across the streaming platforms 179, a personalized tab identifying recommended content across the streaming platforms 179, a live tab identifying live television from IP-based television channels and/or tuner-based television channels, a movies tab that identifies movies across the streaming platforms 179, a shows tab that identifies shows across the streaming platforms 179, and/or an application tab that identifies the applications installed on the television device 152.

The media platform 104 may communicate, over a network 150, with the streaming platforms 179 to identify which media content items are available to be streamed by the television device 152 and identify a set or multiple sets of media content items (e.g., across the various streaming platforms 179) as recommendations in the user interface 156. In some examples, the media platform 104 may determine whether the user of the media aggregator application 166 has rights (e.g., entitlements) to stream media content items from one or more of the streaming platforms 179 (e.g., whether the user has subscribed to access media content from the streaming platform(s) 179), and, if so, may include those media content items as candidates in a selection (e.g., ranking) mechanism to potentially be displayed in the user interface 156. As such, the user may view the media content items from multiple streaming platforms 179 from a single interface (e.g., the user interface 156) and select one of the media content items for playback. When browsing media content items in the user interface 156, the user may identify and select a particular media content item (e.g., select a selectable icon associated with the media content item), which may cause the underlying streaming applications 166 to be launched on the television device 152.

When the television device 152 is initially activated, the user may be directed to a series of interfaces to set-up the television device 152. During the set-up process, the user may select certain applications 164 (e.g., which they have a subscription), which causes the television device 152 to install those applications 164. Also, there may be a list of applications that will be automatically installed (e.g., pre-installed) during the set-up process. The list of applications may be customized across different regions (e.g., countries). For example, the list of pre-installed applications for a television device 152 located in the United States may be different from the list of pre-installed applications for a television device 152 located in the United Kingdom. Also, an OEM 121 may wish to customize the list of pre-installed applications (e.g., to include their preferred application or remove an application from the list) for certain regions or certain types of television devices 152. Furthermore, the user interface 156 may include an area that identifies a list of installed applications for the user (e.g., "my app" section), and the display order of the list may be customized (e.g., application XYZ is placed before application ABC, etc.). In some examples, the OEM 121 may wish to customize the display order of the user's installed applications. Furthermore, other customizations associated with the television device 152 may be defined by the media platform 104 or the OEM 121, as discussed later in the disclosure.

The media platform 104 may include a device customization manager 105 configured to control the customizations (e.g., 134a, 134b) applied to the television devices 152. The device customization manager 105 may include one or more application programming interfaces 116 configured to enable the media platform 104 to communicate with a computing device 132 associated with an administrator of an OEM 121 of the television device 152, a computing device 170 associated with an administrator of the media platform 104, and the television devices (one of which is illustrated as television device 152).

The computing device 170 may include a platform customization application 175 configured to provide a user interface 176 to enable a platform administrator of the media platform 104 to generate and transmit base customization data 110 to the device customization manager 105 on the media platform 104. In some examples, the platform customization application 175 is a web application executable (at least in part) by a web browser to render the user interface 176. In some examples, the platform customization application 175 is a web portal. In some examples, the platform customization application 175 is a native application installed and executed by an operating system of the computing device 170.

The base customization data 110 may be server-based customization data that defines one or more attributes of the user interface 156 and/or functionality related to the user experience of the television device 152. The base customization data 110 includes one or more customizations 134a initially defined by the media platform 104, where some of the customizations 134a may be modifiable by an OEM 121 (e.g., via an OEM customization application 135). In some examples, the customizations 134a are default customizations for the user interface 156. Some of the customizations 134a defined by the media platform 104 may not be modifiable by the OEMs 121 and some of the customizations 134a defined by the media platform 104 may be modifiable by the OEMs 121. The customizations 134a may also be referred to as customization parameters or server-based customization parameters.

The customizations 134a (or a subset thereof) may be associated with a location 122 (e.g., customizations 134a defined for the United States, customization 134a defined for the United Kingdom, customizations 134a defined for another country, etc.). In some examples, the customizations 134a (or a subset thereof) may be associated with one or more device identifiers 124. The device identifier 124 may include an OEM identifier 124a that identifies the OEM 121 of the television device 152. The device identifier 124 may include a product identifier 124b (e.g., a SKU) associated with a type of television device manufactured by the OEM 121.

In some examples, a customization 134a may include metadata (e.g., a value) that indicates whether or not the customization 134a is modifiable by the OEMs 121. If the customization 134a is modifiable by the OEMs 121, the customization 134a may be displayed in a user interface 136 of the OEM customization application 135 as a configurable parameter. If the customization 134a is not modifiable by the OEMs 121, the customization 134a may not be displayed in the user interface 136 as a configurable parameter.

As shown in FIG. 1D, the customizations 134a may include pre-installation data 180. The pre-installation data 180 may be information that identifies a list of applications 164 to be automatically installed on the operating system 154 of the television device 152 during the set-up process (e.g., pre-installed before the user is provided access to the user interface 156). In some examples, the pre-installation data 180 includes a list of application identifiers for a subset of applications 164 (e.g., streaming applications 166). The pre-installation data 180 may define a list of applications 164 for each of a plurality of locations 122. The lists of applications 164 in the pre-installation data 180 may be the default lists defined by the media platform 104. The pre-installation data 180 may identify a list of applications 164 associated with a location 122, and a different list of applications 164 associated with another location 122 and so forth. For example, for the United States, the pre-installation data 180 may identify a list that includes application A, application B. and application C, whereas, for the United Kingdom, the pre-installation data 180 may identify a list that includes application A, application D, and application E.

The customizations 134a may include application placement data 182 that identifies an ordered list of applications 164. The applications 164 on the list may be displayed in a section of the user interface 156 according to a display order defined by the application placement data 182. For example, the application placement data 182 may identify the placement of applications 164 in the section of the user interface 156 (e.g., "My apps" section). The ordered list of applications 164 may define a display arrangement of media content items that correspond to the applications 164 on the ordered list. In some examples, the ordered list of applications 164 includes the same applications 164 identified in the pre-installation data 180, but the ordered list of applications 164 specifies a display order (e.g., a display arrangement) of the applications 164 in the user interface 156.

A media content item may be a selectable UI element (e.g., icon, image) that represents a respective application 164 installed on the operating system 154, which, when selected, causes the respective application 164 to launch and display its respective user interface. The section of the user interface 156 may include an arrangement of slots (e.g., a row of slots) in which each slot is populated with the application's selectable UI element. The application placement data 182 may define which application 164 is populated in which slot (e.g., application C is in slot 1, application A is in slot 2, application B is in slot 3, etc.). In some examples, the ordered list in one location 122 may be different from another location 122. For example, the ordered list for a first location 122 may define that application C is in slot 1, application B is in slot 2, and application C is in slot 3, and the ordered list for a second location 122 may define that application C is in slot 1, application C is in slot 2, and application B is in slot 3.

The customizations 134a may include system notification data 184 about selectable options for triggering a system notification. In some examples, the system notification includes a power-on notification 183. In some examples, the customization 134a relates to an option among a plurality of options for triggering the power-on notification 183. The system notification data 184 may be defined by the media platform 104. In some examples, the system notification data 184 may not be changed by an OEM 121. In some examples, one option for triggering a system notification may be defined for a particular location 122 or a particular device identifier 124, and another option for triggering a system notification may be defined for a particular location 122 or a particular device identifier 124.

The customizations 134a may include input data 186 about enabling or disabling one or more virtual input to the television device 152. A virtual input may be an input that receives media data from an external source, which is not defined by the physical inputs (e.g., HDMI port, USB port, etc.) of the television device 152. A first virtual input may be enabled for receiving media data from a device connected to the television device 152 via a wireless connection (e.g., a Wi-Fi connection). A second virtual input may be enabled for receiving media data from a digital living network alliance (DLNA)-based device. In some examples, the media platform 104 may add virtual inputs at a location-level or a device level (e.g., a SKU level). In some examples, the input data 186 (or a portion thereof) may be defined by an OEM 121 to enable or disable the virtual inputs. The enabling or disabling of a virtual input may be defined for a particular location 122 or a particular device identifier 124.

The customizations 134a may include tuner data 188 providing one or more selectable options associated with an electronic programming guide (EPG) from the EPG application 168. The EPG application 168 may be an application included on the television device 152 that displays programming information (e.g., programs across time slots) for tuner-based channels, e.g., broadcasts received over the air waves by an antenna and tuner on the television device 152. In some examples, the tuner data 188 may indicate whether or not the EPG from the EPG application 168 is included in a portion of the user interface 156 (e.g., included into the live tab of the user interface 156). The enabling or disabling the EPG from the EPG application 168 into the portion of the user interface 156 may be defined for a particular location 122 or a particular device identifier 124. In some examples, the tuner data 188 may indicate whether or not the tracking of user watch-activity from the tuner-based channels is enabled or not. The enabling or disabling the tracking of user watch-activity from the tuner-based channels may be defined for a particular location 122 or a particular device identifier 124.

The customizations 134a may include guide control data 190 identifying a default destination for activation of a guide control selector (e.g., a guide control button). In some examples, the guide control selector is included on a remote control associated with the television device 152. The guide control selector, when selected (e.g., pressed), causes a guide to be displayed on the television device 152, and which guide to be displayed may be defined in the guide control data 190. The default destination may be the EPG from the live tab of the user interface 156 or the EPG from the EPG application 168. The default destination for the activation of the guide control selector may be defined for a particular location 122 or a particular device identifier 124.

The customizations 134a may include an OEM tab data 192 that defines whether content from a system application 169 (e.g., an OEM application) is displayed in the user interface 156 as another tab (e.g., an OEM tab). The content from the system application 169 may include menu(s), settings, and information associated with the television device 152. The system application 169 may be created by the OEM 121 and pre-installed (e.g., during manufacture) on the television device 152. The enabling or disabling of content from the system application 169 into an OEM tab of the user interface 156 may be defined for a particular location 122 or a particular device identifier 124.

As indicated above, the administrator of the media platform 104 may use the interface 136 to define or update the base customization data 110 (e.g., the customizations 134a across locations 122 and/or device identifiers 124). The base customization data 110 may be stored in the configuration database 106 on the media platform 104. The configuration database 106 may also store manufacturer customization data 108 associated with the OEMs 121. The manufacturer customization data 108 may include customization changes 134b defined by the OEMs 121 (e.g., received via computing devices 132). A customization change 134b defined by the OEM 121 may be considered a change to the base customization data 110 (e.g., the corresponding customization 134a).

As shown in FIG. 1C, the configuration database 106 may include the base customization data 110, where the base customization data 110 includes one or more customizations 134a across the locations 122 and/or the device identifiers 124. The device identifiers 124 may be OEM identifiers 124a and/or product identifiers 124b. Also, the configuration database 106 may include the manufacturer customization data 108, where the manufacturer customization data 108 may include customization changes 134b across the locations 122 and/or device identifiers 124. For example, the manufacturer customization data 108 may store customization changes 134b associated with an OEM 121-1. The customization changes 134b associated with the OEM 121-1 may be defined for one or more locations 122 or one or more television devices 152 identifiable by one or more device identifiers 124. The manufacturer customization data 108 may store customization changes 134b for other OEMs 121 such as an OEM 121-2, which may define their customization changes 134b across the locations 122 and/or the device identifiers 124.

The device customization manager 105 may transmit the base customization data 110 (or a portion thereof) to a computing device 132 associated with an administrator of an OEM 121. The computing device 132 may include an OEM customization application 135 configured to provide a user interface 136 to enable the administrator of the OEM 121 to view the base customization data 110 and potentially make changes to the base customization data 110 for television devices 152 associated with that OEM 121. In some examples, the OEM customization application 135 is a web application executable (at least in part) by a web browser to render the user interface 136. In some examples, the OEM customization application 135 is a web portal. In some examples, the OEM customization application 135 is a native application installed and executed by an operating system of the computing device 132.

The administrator may view the base customization data 110 via the user interface 136. The administrator may use the user interface 136 to change one or more aspects of the base customization data 110. For example, an OEM administrator may use the OEM customization application 135 to change the list of pre-installed applications, change the ordered list of applications to be displayed in the user interface 156, and/or change aspects of the system notification data 184, the input data 186, the tuner data 188, the guide control data 190, and/or the OEM tab data 192 for one or more locations 122 and/or one or more device identifiers 124 associated with that particular OEM 121.

As an example, the customizations 134a may include a list of applications to be preinstalled for the United States (e.g., application A, application B, and application C), and the customization change 134b may include information that identifies application B with an action such as remove application B for television devices having a device identifier 124 (e.g., the OEM identifier 124a or the product identifier 124b). As another example, the customization 134a may include an ordered list of applications to display in the user interface 156 in the United States (e.g., application A in slot 1, application B in slot 2, application C in slot 3), and the customization change 134b may include information that identifies application D with an action to add application D in slot 2 and remove application B from slot 2).

When a customization 134a defined by the base customization data 110 is changed, the OEM customization application 135 may generate a customization change 134b-1 that changes the customization 134a. The OEM customization application 135 may transmit a change request 138, via the API(s) 116, to the device customization manager 105, where the change request 138 includes the customization change 134b-1. At this point, the customization change 134b-1 may be considered a pending request, which, when approved, becomes a customization change 134b stored in a production database 109 of the configuration database 106. When pending, the customization change 134b-1 is stored in a staging database 111 of the configuration database 106. In some examples, the staging database 111 is used to test the customizations with a text television device 152a.

The device customization manager 105 may include a change adjustor 107 configured to receive the change request 138 and store the customization change 134b-1 (included in the change request 138) in the staging database 111. The device customization manager 105 may transmit, via the API(s) 116, a pending change request 140 to the platform customization application 175 such that the details of the customization change 134b-1 are displayed in the user interface 176. In some examples, change requests 138 from the computing device 132 are routed (e.g., in real-time or near real-time) to the computing device 170. The administrator of the media platform 104 may decide to approve or deny the customization change 134b-1 by selecting a UI element from the user interface 176. When a selection is received, the platform customization application 175 may transmit, via the API(s) 116, a request response 142 to the device customization manager 105. The request response 142 may indicate whether or not the customization change 134b-1 has been approved or denied. When approved, the change adjustor 107 may transfer the customization change 134b-1 from the staging database 111 to the production database 109. When denied, the change adjustor 107 may discard the customization change 134b-1 from the configuration database 106.

The television device 152 may include a configuration application 155. In some examples, the configuration application 155 is defined by the OEM 121 and added to a memory device 153 of the television device 152 during the manufacture of the television device 152. In some examples, the configuration application 155 is a configuration XML file that is loaded into the television device 152. The configuration application 155 may include client-side customization data 158. The client-side customization data 158 may include one or more static customizations (e.g., customization parameters) about the user interface 156. The operating system 154 may include a customization engine 162. The customization engine 162 is configured to communicate with a configuration library 160 configured to read and parse the configuration application 155. Also, the customization engine 162 is configured to communicate over the network 150 (via the APIs 116) with the device customization manager 105 to retrieve server-based customization data 114 for the television device 152.

When the television device 152 is activated (e.g., booted), the customization engine 162 may invoke a configuration library 160 to read and parse the configuration application 155, including the client-side customization data 158. The client-side customization data 158 may include static customizations. The configuration library 160 may read and parse the configuration application 155 to obtain the client-side customization data 158 when the television device 152 is initially activated (e.g., booted). In some examples, the configuration library 160 obtains the client-side customization data 158 only one time. The customization engine 162 may obtain the client-side customization data 158 from the configuration application 155 and store the client-side customization data 158 in a memory device 153 of the television device 152.

The customization engine 162 may determine whether or not the television device 152 is connected to the network 150 and/or whether the user has logged-into their user account 141 on the television device 152. In some examples, if the television device 152 is not connected to the network 150, the customization engine 162 may determine to operate in a restricted mode 185. In some examples, if the user has not logged-into their user account 141 on the television device 152, the customization engine 162 may determine to operate in the restricted mode 185. The client-side customization data 158 may determine one or more aspects of the user interface 156 when the television device 152 operates in the restricted mode 185. In some examples, the client-side customization data 158 may include application placement data 182a for the restricted mode 185.

The application placement data 182a for the restricted mode 185 defines an ordered list of system applications 164. The customization engine 162 is configured to use the application placement data 182a to populate a section of the user interface 156 of the television device 152. The section (e.g., row) of the user interface 156 may identify each system application 169 as a selectable icon, which, when selected, causes a respective system application 169 to be launched. The ordered list may include the application identifiers of the system applications 169 in a sequence or order. The system applications 164 may be applications installed on the television device 152 by the manufacturer. The system applications 164 may include an EPG application 168 and a media player application 193.

The application placement data 182a for the restricted mode 185 may be defined for one or more locations 122. As such, the application placement data 182a may include multiple ordered lists of system application 169, where each one corresponds to a different location 122. If the television device 152 is located in a first location 122, the customization engine 162 may derive the ordered list that corresponds to the first location 122 from the application placement data 182a for the restricted mode 185. If the television device 152 is located in a second location 122, the customization engine 162 may derive the ordered list that corresponds to the second location 122 from the application placement data 182a for the restricted mode 185.

In some examples, the client-side customization data 158 may include a deep content link 171 for the EPG application 168. The deep content link 171 may be used by the customization engine 162 to incorporate content from the EPG application 168 into the user interface 156. The deep content link 171 may be an identifier that identifies a location of the EPG application 168 on the operating system 154, which is used to launch the EPG application 168. In some examples, the client-side customization data 158 may include deep content links 171 for multiple locations 122 and/or product identifiers 124b. If the television device 152 is located in a particular location 122, the customization engine 162 may derive the deep content link 171 for the particular location 122. If the television device 152 has a particular product identifier 124, the customization engine 162 may derive the deep content link 171 for the particular product identifier 124.

If the user has logged-into their user account 141 on the television device 152 (e.g., an authentication credential 167 of the user account 141 has been successfully authenticated), and, in some examples, if the television device 152 is connected to the network 150, the customization engine 162 may transmit, via the API(s) 116, a configuration request 120 to the device customization manager 105. In some examples, the customization engine 162 may transmit the configuration request 120 during the set-up process of the television device 152. In some examples, the customization engine 162 may periodically transmit the configuration request 120 (e.g., at separate time instances). For the customization engine 162 may transmit the configuration request 120 every set period of time (e.g., daily, weekly, monthly, or multiple times a day).

The configuration request 120 may include a location 122 of the television device 152. In some examples, the customization engine 162 may obtain the location 122 of the television device 152 from information stored on the operating system 154. In some examples, the customization engine 162 may obtain the location 122 from a location service module on the television device 152. In some examples, the customization engine 162 may obtain the location 122 from information entered by the user during the set-up process. The location 122 may identify a geographical region in which the television device 152 is located. In some examples, the location 122 identifies a country in which the television device 152 is located. The configuration request 120 may include a device identifier 124 associated with the television device 152. The customization engine 162 may obtain the device identifier 124 from information stored on the operating system 154. The customization engine 162 may obtain the device identifier 124 from the configuration application 155. In some examples, the device identifier 124 includes an OEM identifier 124a that identifies the OEM of the television device 152. In some examples, the device identifier 124 includes a product identifier 124b that identifies the type (e.g., model) of the television device 152. In some examples, the device identifier 124 includes a combination of the OEM identifier 124a and the product identifier 124b. In some examples, the configuration request 120 also includes a user identifier that identifies the user account 141 associated with the media platform 104.

The device customization manager 105 may receive the configuration request 120, and, in response to the configuration request 120, the device customization manager 105 may generate server-based customization data 114. For example, the device customization manager 105 includes a configuration data selector 112. The configuration data selector 112 is configured to generate the server-based customization data 114 based on the base customization data 110 and the manufacturer customization data 108 that correspond to at least one of the location 122 or the device identifier 124 included in the configuration request 120. In some examples, the configuration data selector 112 may merge the base customization data 110 and the manufacturer customization data 108 to generate the server-based customization data 114.

The configuration data selector 112 may select a portion (e.g., one or more of the customizations 134a) of the base customization data 110 that correspond to the location 122 of the television device 152. As an example, with respect to the pre-installation data 180, the configuration data selector 112 may obtain a pre-installation list for the United States if the location 122 identifies the United States. In some examples, if other customization(s) 134a defined in the base customization data 110 are identified by the device identifier 124, the configuration data selector 112 may obtain the relevant customizations 134a using the device identifier 124.

The configuration data selector 112 may select a portion (e.g., one or more of the customization changes 134b) of the manufacturer customization data 108 that correspond to the location 122 and/or the product identifier 124 included in the configuration request 120. As an example, with respect to the pre-installation data 180, the configuration data selector 112 may select one or more customization changes 134b that change the pre-installation list for the United States. For example, a customization change 134b may indicate to add a particular application 164 to the pre-installation list of the base customization data 110 and another customization change 134b may indicate to remove a particular application 164 from the pre-installation list of the base customization data 110. of the television device 152. For one or more of the customizations 134a defined by base customization data 110 that correspond to the location 122 and/or the device identifier 124, the configuration data selector 112 may merge a corresponding configuration change 134b from the manufacturer customization data 108.

As shown in FIG. 1F, the configuration data selector 112 may obtain the base customization data 110 that corresponds to the location 122 of the television device 152. The base customization data 110 includes a pre-installation list of applications 164 in a sequence or order that defines the display order of the applications 164 in a section of the user interface 156 for a certain location 122 (e.g., the United States). The base customization data 110 of FIG. 1F depicts a combination of the pre-installation data 180 and the application placement data 182. The customization changes 134b of the manufacturer customization data 108 depict four changes to the base customization data 110 that adjusts the applications included on the pre-installation list and the display order of the applications 164. In response to the configuration request 120, the configuration data selector 112 is configured to merge the manufacturer customization data 108 with the base customization data 110 to generate the server-based customization data 114.

FIG. 1G illustrates another aspect of the configuration data selector 112. As shown in FIG. 1G, the configuration data selector 112 may obtain the base customization data 110 that corresponds to the location 122 of the television device 152. The base customization data 110 includes a pre-installation list of applications 164 for a certain location 122 (e.g., the United States). The base customization data 110 of FIG. 1G may be the pre-installation data 180. In FIG. 1G, the customization changes 134b of the manufacturer customization data 108 depict three changes to the base customization data 110 that adjusts the applications included on the pre-installation list. In response to the configuration request 120, the configuration data selector 112 is configured to merge the manufacturer customization data 108 with the base customization data 110 to generate the server-based customization data 114.

As indicated above, the customization engine 162 may periodically transmit the configuration request 120 to the device customization manager 105. In response to each configuration request 120, the configuration data selector 112 may merge the relevant portions of the manufacturer customization data 108 and the base customization data 110 that correspond to the location 122 and/or the device identifier 124. In other words, the server-based customization data 114 is generated (e.g., the merging operation is executed) each time the configuration request 120 is received. An OEM administrator may use the OEM customization application 135 to generate other customization changes 134b over time, and these customization changes 134b can be dynamically implemented on the relevant television devices 152.

The media platform 104 may be executed by one or more server computers 102. The server computer(s) 102 may include one or more processors 101 and one or more memory devices 103. The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include a main memory that stores information in a format that can be read and/or executed by the processor(s) 101. The memory device(s) 103 may include one or more random-access memory (RAM) devices and/or one or more read-only memory (ROM) devices. In some examples (not shown), the memory devices may include external storage, e.g., memory physically remote from but accessible by the server computer 102. The server computer 102 may include one or more modules or engines representing specially programmed software. The memory device(s) 103 may store the configuration database 106. The memory device(s) 103 may store applications (e.g., including an operating system) including executable instructions that, when executed by the processors 101, cause execution of the operations associated with the media platform 104 and any sub-components of the media platform 104.

A server computer 102 may be computing devices that take the form of a number of different devices, for example a standard server, a group of such servers, or a rack server system. In some examples, a server computer 102 may be a distributed system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections. The steaming platforms 179 and the digital media store 147 may be executable by one or more server computers 102.

Figure 2:
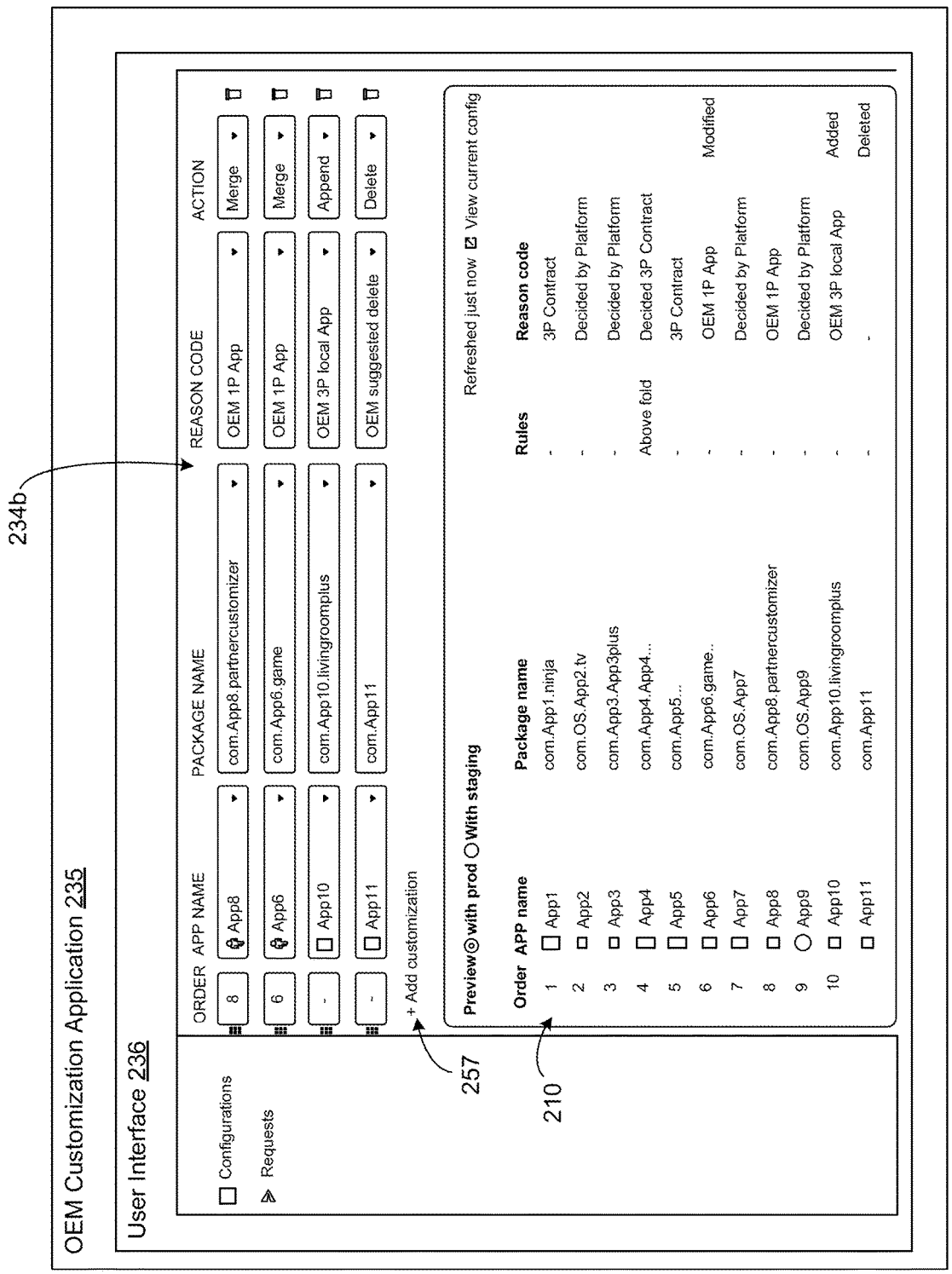
FIG. 2 illustrates an example user interface of an OEM customization application according to an aspect.

FIG. 2 illustrates an example user interface 236 of an OEM customization application 235. The OEM customization application 235 may be an example of the OEM customization application 235 and may include any of the details discussed with reference to FIGS. 1A through 1G. The user interface 236 may display base customization data 210 depicting a pre-installation list of applications with an order. The order defines the display order in which the applications are displayed in a section of a user interface. The user interface 236 also displays the OEM's customization changes 234b. Also, the user interface 236 includes a selectable element 257, which, when selected, enables the OEM administrator to define a customization change 234b, which causes the OEM customization application 235 to transmit a change request (e.g., the change request 138 of FIG. 1A).

Figure 3A:
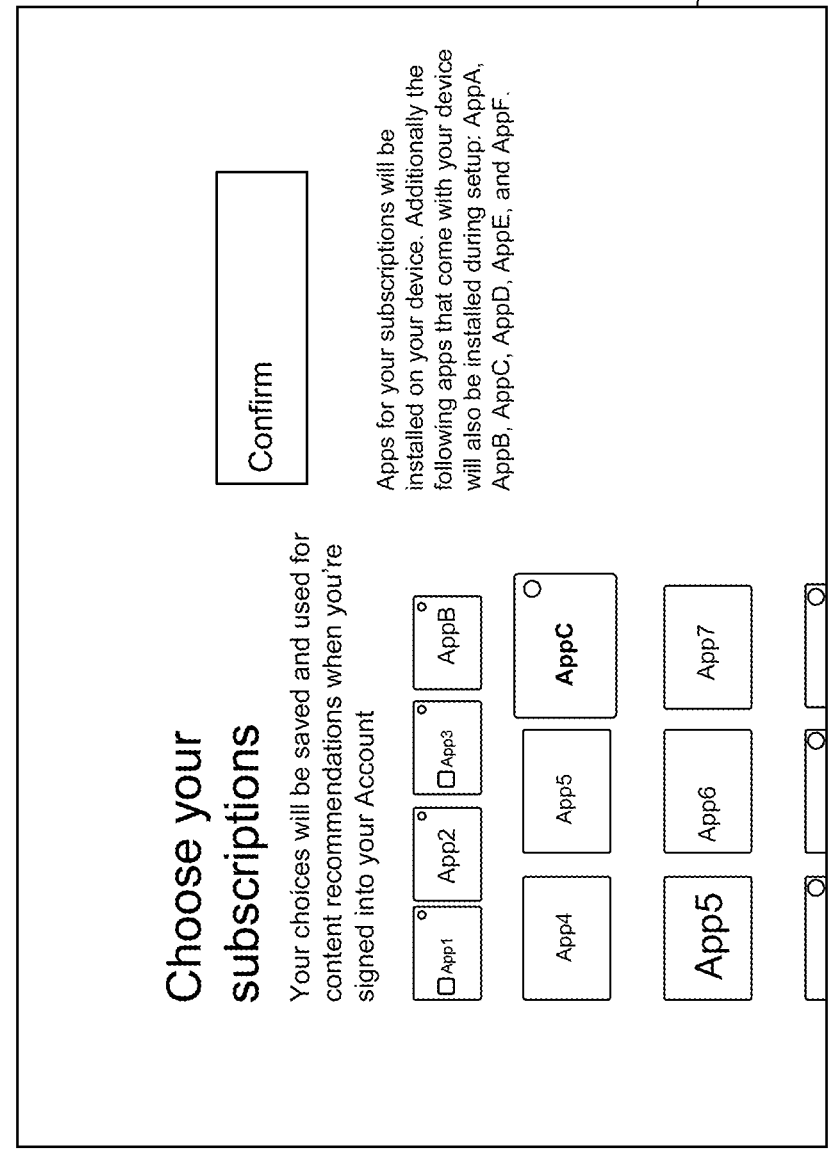
FIG. 3A illustrates an example user interface displayed by a television device during a set-up process according to an aspect.

FIG. 3A illustrates an example user interface 329 displayed by a television device during a set-up process of the television device. The television device may be an example of the television device 152 of FIGS. 1A through 1G and may include any of the details discussed herein with respect to those figures. During the set-up process, the user may select one or more subscriptions which the user has a subscription, which may cause the television device to download and install those user selected applications. Also, the user interface 329 may depict information 331 about a pre-installation list that identifies which applications are automatically installed. In some examples, the information 331 is generated based on the server-based customization data 114 as described in FIGS. 1A through 1G.

Figure 3B:
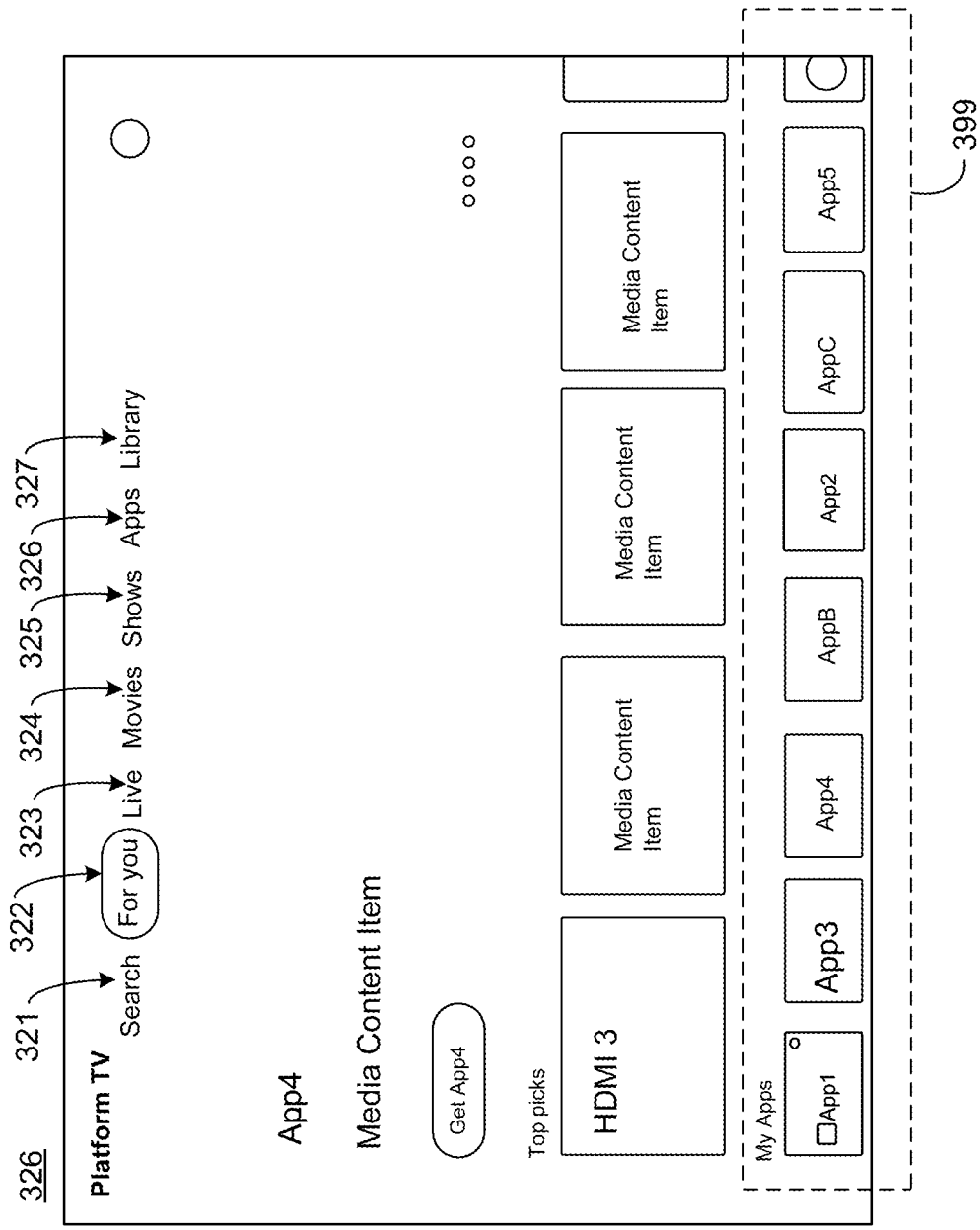
FIG. 3B illustrates an example user interface displayed by a television device according to an aspect.

FIG. 3B illustrates an example user interface 356 displayed by a television device. The user interface 356 may be an example of the user interface 156 of FIGS. 1A through 1G and may include any of the details discussed with reference to those figures. In some examples, the user interface 356 includes a tabbed interface having a plurality of tabs such as a search tab 321, a personalized tab 322, a live tab 323, a movies tab 324, a shows tab 325, an apps tab 326, and a library tab 327. The user interface 356 displays the personalized tab 322. The personalized tab 322 may include media content items that are selected by a media platform (e.g., the media platform 104 of FIGS. 1A through 1G). The user interface 356 may include a section 399 that identifies a list of applications that are installed on the television device. In some examples, the section 399 is a row of media content items that correspond to the list of applications. The applications identified in the section 399 may correspond to the list of applications included in the pre-installation data 180 of FIGS. 1A through 1G. Also, the application identified in the section 399 may be arranged in an order that corresponds to the application placement data 182 of FIGS. 1A through 1G.

Figure 4:
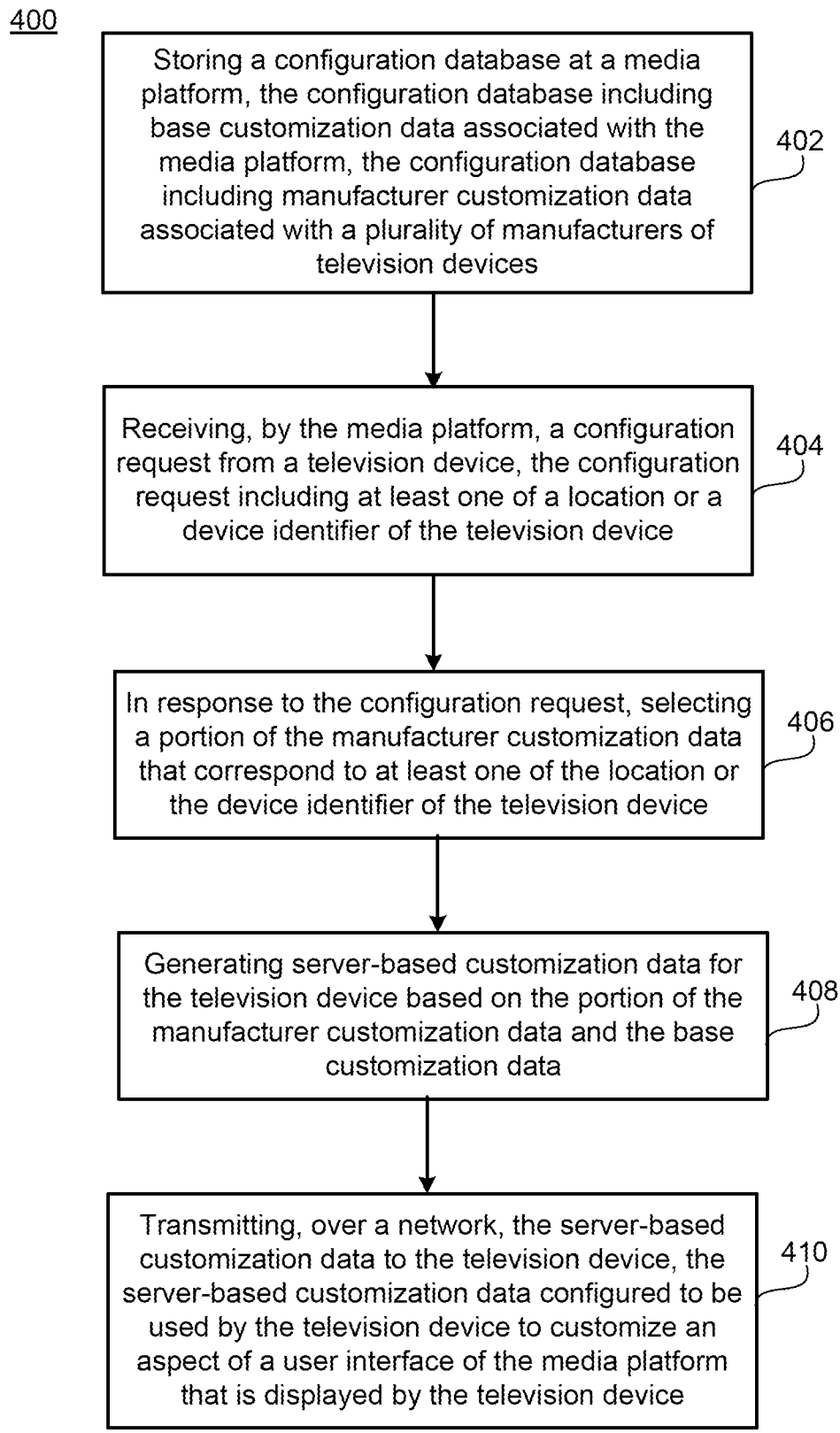
FIG. 4 illustrates a flowchart depicting example operations of a system for customizing a television device that renders a user interface associated with a media platform based on one or more attributes such as a location and/or a device identifier according to an aspect.

FIG. 4 illustrates a flowchart 400 depicting example operations of a system for customizing a television device that renders a user interface associated with a media platform based on one or more attributes such as a location of the television device and/or a device identifier of the television device. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion. The operations may define a computer-implemented method. Although the flowchart 400 is described with reference to the system 100 of FIGS. 1A through 1G, the flowchart 400 may be executed according to any of the figures discussed herein. In some examples, the operations are executed by the media platform 104 of FIGS. 1A through 1G.

Operation 402 includes storing a configuration database 106 at a media platform 104, the configuration database 106 including base customization data 110 associated with the media platform 104, the configuration database 106 including manufacturer customization data 108 associated with a plurality of manufacturers (e.g., OEMs 121) of television devices 152. Operation 404 includes receiving, by the media platform 104, a configuration request 120 from a television device 152, the configuration request 120 including at least one of a location 122 or a device identifier 124 of the television device 152. Operation 406 includes, in response to the configuration request 120, selecting a portion of the manufacturer customization data 108 that correspond to at least one of the location 122 or the device identifier 124 of the television device 152.

Operation 408 includes generating server-based customization data 114 for the television device 152 based on the portion of the manufacturer customization data 108 and the base customization data 110. Operation 410 includes transmitting, over a network 150, the server-based customization data 114 to the television device 152, the server-based customization data 114 configured to be used by the television device 152 to customize an aspect of a user interface 156 of the media platform 104 that is displayed by the television device 152.

In some examples, the operations include generating the server-based customization data for the television device includes merging, in response to the configuration request, the portion of the manufacturer customization data with the base customization data. In some examples, the operations include receiving, by the media platform, the base customization data from a computing device associated with an administrator of the media platform. In some examples, the computing device is a first computing device, and the operations include receiving, by the media platform, a change request from a second computing device associated with an administrator of a manufacturer of the television device, the change request including a requested customization to the television device, transmitting, by the media platform, change request data to the first computing device, the change request data including information that identifies the requested customization, receiving, by the media platform, a request response from the first computing device, the request response including information that identifier whether the requested customization is approved, and, in response to the requested customization being approved, storing the requested customization with the manufacturer customization data in the configuration database.

In some examples, the operations include storing the requested customization in a staging database of the configuration database while the requested customization is pending, and, in response to the requested customization being approved, transferring the requested customization from the staging database to a production database of the configuration database. In some examples, the operations include, in response to the configuration request, selecting a portion of the base customization data that correspond to the location of the television device. The base customization data may include pre-installation data defining a list of applications to be installed on an operating system of the television device, the manufacturer customization data including a change to the list of applications. The base customization data may include application placement data defining an ordered list of applications to be identified in the user interface of the television device, the manufacturer customization data including a change to an order of the ordered list. In some examples, the base customization data may include tuner data that identifies whether or not an electronic programming guide (EPG) of an EPG application is included in a section of the user interface. In some examples, the configuration request is a first configuration request, and the operations include receiving, by the media platform, a second configuration request at a time subsequent to the first configuration request, in response to the second configuration request, re-selecting the portion of the manufacturer customization data that correspond to at least one of the location or the device identifier of the television device, and re-generating the server-based customization data for the television device based on the portion of the manufacturer customization data and the base customization data.

Figure 5:
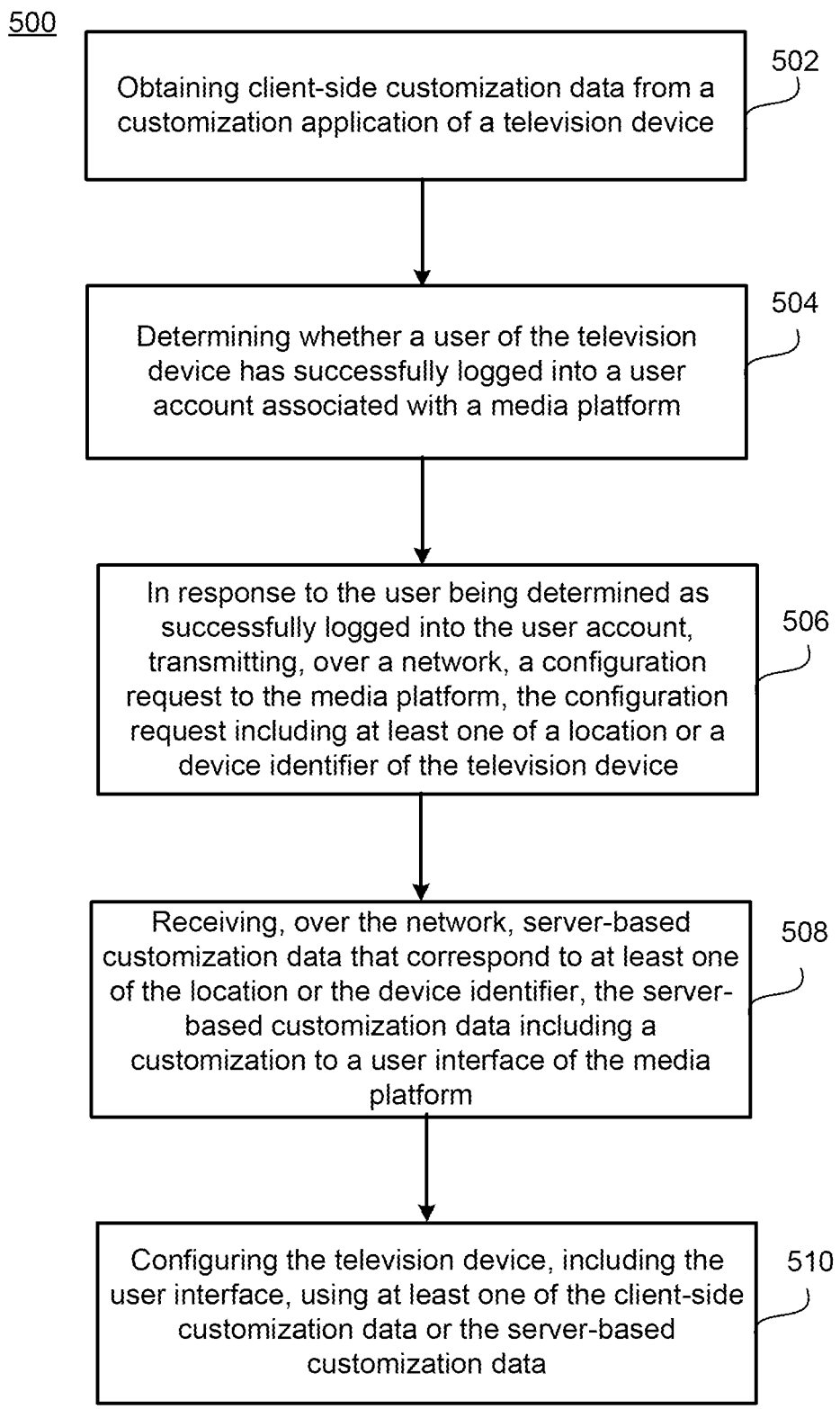
FIG. 5 illustrates a flowchart depicting example operations of a system for customizing a television device that renders a user interface associated with a media platform based on one or more attributes such as a location and/or a device identifier according to another aspect.

FIG. 5 illustrates a flowchart 500 depicting example operations of a system for customizing a television device that renders a user interface associated with a media platform based on one or more attributes such as a location of the television device and/or a device identifier of the television device. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. The operations may define a computer-implemented method. Although the flowchart 500 is described with reference to the system 100 of FIGS. 1A through 1G, the flowchart 500 may be executed according to any of the figures discussed herein. In some examples, the operations are executed by the television device 152 of FIGS. 1A through 1G.

Operation 502 includes obtaining client-side customization data 158 from a customization application 155 of a television device 152. Operation 504 includes determining whether a user of the television device 152 has successfully logged into a user account 141 associated with a media platform 104. Operation 506 includes, in response to the user being determined as successfully logged into the user account 141, transmitting, over a network 150, a configuration request 120 to the media platform 104, the configuration request 120 including at least one of a location 122 or a device identifier 124 of the television device 152. Operation 508 includes receiving, over the network 150, server-based customization data 114 that correspond to at least one of the location 122 or the device identifier 124, the server-based customization data 114 including a customization to a user interface 156 of the media platform 104. Operation 510 includes configuring the television device 152, including the user interface 156, using at least one of the client-side customization data 158 or the server-based customization data 114.

In some aspects, the techniques described herein relate to a non-transitory computer-readable medium storing executable instructions that when executed by at least one processor cause the at least one processor to execute operations, the operations including: obtaining client-side customization data from a customization application of a television device; determining whether a user of the television device has successfully logged into a user account associated with a media platform; in response to the user being determined as successfully logged into the user account, transmitting, over a network, a configuration request to the media platform, the configuration request including at least one of a location or a device identifier of the television device; receiving, over the network, server-based customization data that correspond to at least one of the location or the device identifier, the server-based customization data including a customization to a user interface of the media platform; and configuring the television device, including the user interface, using at least one of the client-side customization data or the server-based customization data.

In some aspects, the techniques described herein relate to a non-transitory computer-readable medium, wherein the customization includes a customization change to base customization data stored on the media platform, the base customization data being defined by the media platform, the customization change being defined by a manufacturer of the television device.

In some aspects, the techniques described herein relate to a non-transitory computer-readable medium, wherein the operations further include: rendering the user interface on a display of the television device, the user interface including a section that identifies a list of applications in a display order, the list of applications and the display order being determined based on the server-based customization data.

In some aspects, the techniques described herein relate to a non-transitory computer-readable medium, wherein the client-side customization data includes application placement data defining an ordered list of system applications to be displayed in a restricted mode, the operations further including: in response to the user being determined as not successfully logged into the user account, enabling the restricted mode for the television device; and rendering the user interface in the restricted mode on a display of the television device, the user interface in the restricted mode including a section that identifies the ordered list of system applications.

In some aspects, the techniques described herein relate to a non-transitory computer-readable medium, wherein the client-side customization data includes a deep content link to an electronic programming guide (EPG) of an EPG application stored on the television device.

In some aspects, the techniques described herein relate to an apparatus including: at least one processor; and a non-transitory computer-readable medium storing executable instructions that when executed by at least one processor cause the at least one processor to: receive, over a network, base customization data from a computing device associated with an administrator of a media platform; store the base customization data in a configuration database, the configuration database also storing manufacturer customization data associated with a plurality of manufacturers of television devices; receive a configuration request from a television device, the configuration request including at least one of a location or a device identifier of the television device; in response to the configuration request, select a portion of the manufacturer customization data that correspond to at least one of the location or the device identifier of the television device; generate server-based customization data for the television device based on the portion of the manufacturer customization data and the base customization data; and transmit, over a network, the server-based customization data to the television device, the server-based customization data configured to be used by the television device to customize an aspect of a user interface of the media platform that is displayed by the television device.

In some aspects, the techniques described herein relate to an apparatus, wherein the executable instructions include instructions that cause the at least one processor to: merge, in response to the configuration request, the portion of the manufacturer customization data with the base customization data.

In some aspects, the techniques described herein relate to an apparatus, wherein the computing device is a first computing device, wherein the executable instructions include instructions that cause the at least one processor to: receive a change request from a second computing device associated with an administrator of a manufacturer of the television device, the change request including a requested customization to the television device; transmit, by the media platform, change request data to the first computing device, the change request data including information that identifies the requested customization; receive, by the media platform, a request response from the first computing device, the request response including information that identifier whether the requested customization is approved; and in response to the requested customization being approved, store the requested customization with the manufacturer customization data in the configuration database.

In some aspects, the techniques described herein relate to an apparatus, wherein the executable instructions include instructions that cause the at least one processor to: store the requested customization in a staging database of the configuration database while the requested customization is pending; and in response to the requested customization being approved, transfer the requested customization from the staging database to a production database of the configuration database.

In some aspects, the techniques described herein relate to an apparatus, wherein the base customization data includes pre-installation data defining a list of applications to be installed on an operating system of the television device, the manufacturer customization data including a change to the list of applications.

In some aspects, the techniques described herein relate to an apparatus, wherein the base customization data includes application placement data defining an ordered list of applications to be identified in the user interface of the television device, the manufacturer customization data including a change to an order of the ordered list.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   storing a configuration database at a media platform, the configuration database including base customization data associated with the media platform, the configuration database including manufacturer customization data associated with a plurality of manufacturers of television devices;
   receiving a change request from a computing device associated with a manufacturer of a television device, the change request including a requested customization to the television device;

in response to the change request being approved, storing the requested customization with the manufacturer customization data in the configuration database;
receiving, by the media platform, a configuration request from the television device, the configuration request including at least one of a location or a device identifier of the television device;
in response to the configuration request, selecting a portion of the manufacturer customization data that correspond to at least one of the location or the device identifier of the television device;
generating server-based customization data for the television device based on the portion of the manufacturer customization data and the base customization data; and
transmitting, over a network, the server-based customization data to the television device, the server-based customization data configured to be used by the television device to customize an aspect of a user interface of the television device.

2. The method of claim 1, wherein generating the server-based customization data for the television device includes merging, in response to the configuration request, the portion of the manufacturer customization data with the base customization data.

3. The method of claim 1, wherein the computing device is a first computing device, the method further comprising:
receiving, by the media platform, the base customization data from a second computing device associated with the media platform.

4. The method of claim 3, wherein the computing device is a first computing device, the method further comprising:
transmitting, by the media platform, change request data to the second computing device, the change request data including information that identifies the requested customization; and
receiving, by the media platform, a request response from the second computing device, the request response including information that identifier whether the requested customization is approved.

5. The method of claim 4, further comprising:
storing the requested customization in a staging database of the configuration database while the requested customization is pending; and
in response to the requested customization being approved, transferring the requested customization from the staging database to a production database of the configuration database.

6. The method of claim 1, further comprising:
in response to the configuration request, selecting a portion of the base customization data that correspond to the location of the television device.

7. The method of claim 1, wherein the base customization data includes pre-installation data defining a list of applications to be installed on an operating system of the television device, the manufacturer customization data including a change to the list of applications.

8. The method of claim 1, wherein the base customization data includes application placement data defining an ordered list of applications to be identified in the user interface of the television device, the manufacturer customization data including a change to an order of the ordered list of applications.

9. The method of claim 1, wherein the base customization data includes tuner data that identifies whether or not an electronic programming guide (EPG) of an EPG application is included in a section of the user interface.

10. The method of claim 1, wherein the configuration request is a first configuration request, the method further comprising:
receiving, by the media platform, a second configuration request at a time subsequent to the first configuration request;
in response to the second configuration request, re-selecting the portion of the manufacturer customization data that correspond to at least one of the location or the device identifier of the television device; and
re-generating the server-based customization data for the television device based on the portion of the manufacturer customization data and the base customization data.

11. A non-transitory computer-readable medium storing executable instructions that when executed by at least one processor cause the at least one processor to execute operations, the operations comprising:
obtaining client-side customization data from a customization application of a television device;
determining whether a user of the television device has successfully logged into a user account associated with a media platform;
in response to the user being determined as successfully logged into the user account, transmitting, over a network, a configuration request to the media platform, the configuration request including at least one of a location or a device identifier of the television device;
receiving, over the network, server-based customization data that correspond to at least one of the location or the device identifier, the server-based customization data including base customization data associated with the media platform, and manufacturer customization data associated with a manufacturer of the television device, the manufacturer customization data including a change to a display order of a list of applications displayed on a user interface of an operating system of the television device; and
configuring the television device, including the user interface, using the client-side customization data and the server-based customization data.

12. The non-transitory computer-readable medium of claim 11, wherein the client-side customization data includes application placement data defining an ordered list of system applications to be displayed in a restricted mode, the operations further comprising:
in response to the user being determined as not successfully logged into the user account, enabling the restricted mode for the television device; and
rendering the user interface in the restricted mode on a display of the television device, the user interface in the restricted mode including a section that identifies the ordered list of system applications.

13. The non-transitory computer-readable medium of claim 11, wherein the client-side customization data includes a deep content link to an electronic programming guide (EPG) of an EPG application stored on the television device.

14. An apparatus comprising:
at least one processor; and
a non-transitory computer-readable medium storing executable instructions that when executed by at least one processor cause the at least one processor to:
receive, over a network, base customization data from a first computing device associated with a media platform;

store the base customization data in a configuration database, the configuration database also storing manufacturer customization data associated with a plurality of manufacturers of television devices;

receive a change request from a second computing device associated with a manufacturer of a television device, the change request including a requested customization to the television device;

in response to the change request being approved, store the requested customization with the manufacturer customization data in the configuration database;

receive a configuration request from a television device, the configuration request including at least one of a location or a device identifier of the television device;

in response to the configuration request, select a portion of the manufacturer customization data that correspond to at least one of the location or the device identifier of the television device;

generate server-based customization data for the television device based on the portion of the manufacturer customization data and the base customization data; and transmit, over a network, the server-based customization data to the television device, the server-based customization data configured to be used by the television device to customize an aspect of a user interface of the the television device.

15. The apparatus of claim 14, wherein the executable instructions include instructions that cause the at least one processor to:

merge, in response to the configuration request, the portion of the manufacturer customization data with the base customization data.

16. The apparatus of claim 14, wherein the executable instructions include instructions that cause the at least one processor to:

transmit, by the media platform, change request data to the first computing device, the change request data including information that identifies the requested customization; and receive, by the media platform, a request response from the first computing device, the request response including information that identifier whether the requested customization is approved.

17. The apparatus of claim 16, wherein the executable instructions include instructions that cause the at least one processor to:

store the requested customization in a staging database of the configuration database while the requested customization is pending; and in response to the requested customization being approved, transfer the requested customization from the staging database to a production database of the configuration database.

18. The apparatus of claim 14, wherein the base customization data includes pre-installation data defining a list of applications to be installed on an operating system of the television device, the manufacturer customization data including a change to the list of applications.

19. The apparatus of claim 14, wherein the base customization data includes application placement data defining an ordered list of applications to be identified in the user interface of the television device, the manufacturer customization data including a change to an order of the ordered list of applications.

* * * * *